United States Patent

Sokolean

[11] Patent Number: 5,799,723
[45] Date of Patent: Sep. 1, 1998

[54] CONTACT ELEMENT AND CEILING ELEMENT FOR A HEATING AND COOLING CEILING

[75] Inventor: Helmuth Sokolean, Uerikon, Switzerland

[73] Assignee: Barcol-Air AG, Stäfa, Switzerland

[21] Appl. No.: 710,555

[22] Filed: Sep. 19, 1996

[30] Foreign Application Priority Data

Sep. 23, 1995 [CH] Switzerland .......... 02 684/95

[51] Int. Cl.$^6$ .......... F24D 19/02
[52] U.S. Cl. .......... 165/49; 165/53; 165/168; 237/69
[58] Field of Search .......... 165/49, 53, 56, 165/168, 171, 47; 237/69

[56] References Cited

U.S. PATENT DOCUMENTS

| | | | |
|---|---|---|---|
| 3,379,241 | 4/1968 | Gau | 165/171 |
| 3,786,230 | 1/1974 | Brandenburg, Jr. | 165/56 X |
| 4,064,866 | 12/1977 | Knight, Jr. | 165/49 X |
| 4,369,836 | 1/1983 | Bleckmann | 165/49 X |
| 5,542,603 | 8/1996 | Macduff | 237/69 |

FOREIGN PATENT DOCUMENTS

| | | | |
|---|---|---|---|
| 0445391 | 9/1991 | European Pat. Off. | 237/69 |
| 1046905 | 12/1953 | France | 237/69 |
| 1107119 | 12/1955 | France . | |
| 0134527 | 6/1986 | Japan | 237/69 |
| 241602 | 8/1946 | Switzerland . | |
| 298442 | 7/1954 | Switzerland . | |
| 305373 | 5/1955 | Switzerland . | |
| 0807649 | 1/1959 | United Kingdom | 165/49 |
| 8201058 | 4/1982 | WIPO | 165/56 |

*Primary Examiner*—Ira S. Lazarus
*Assistant Examiner*—Christopher Atkinson
*Attorney, Agent, or Firm*—Finnegan, Henderson, Farabow, Garrett & Dunner, L.L.P.

[57] ABSTRACT

A ceiling element for a heating and cooling ceiling, having a pipe (3) and a ceiling panel (1), comprises, for the purpose of producing good heat-conducting contact between these parts, a contact element (4), which is formed by bending sheet metal, consisting, for example, of a copper alloy, and a guide channel (5) which is open at the bottom and by means of which the contact element is snap-fitted onto the pipe (3). Provided on each of the two side borders of the contact element (4) is a row of contact fingers (6) which are produced by punching or chemical milling, are designed as thin elastically deformable strips, project downwards and outwards, fit snugly against the upper side of the ceiling panel (1) in each case and rest closely up against said ceiling panel even if it has irregularities.

19 Claims, 2 Drawing Sheets

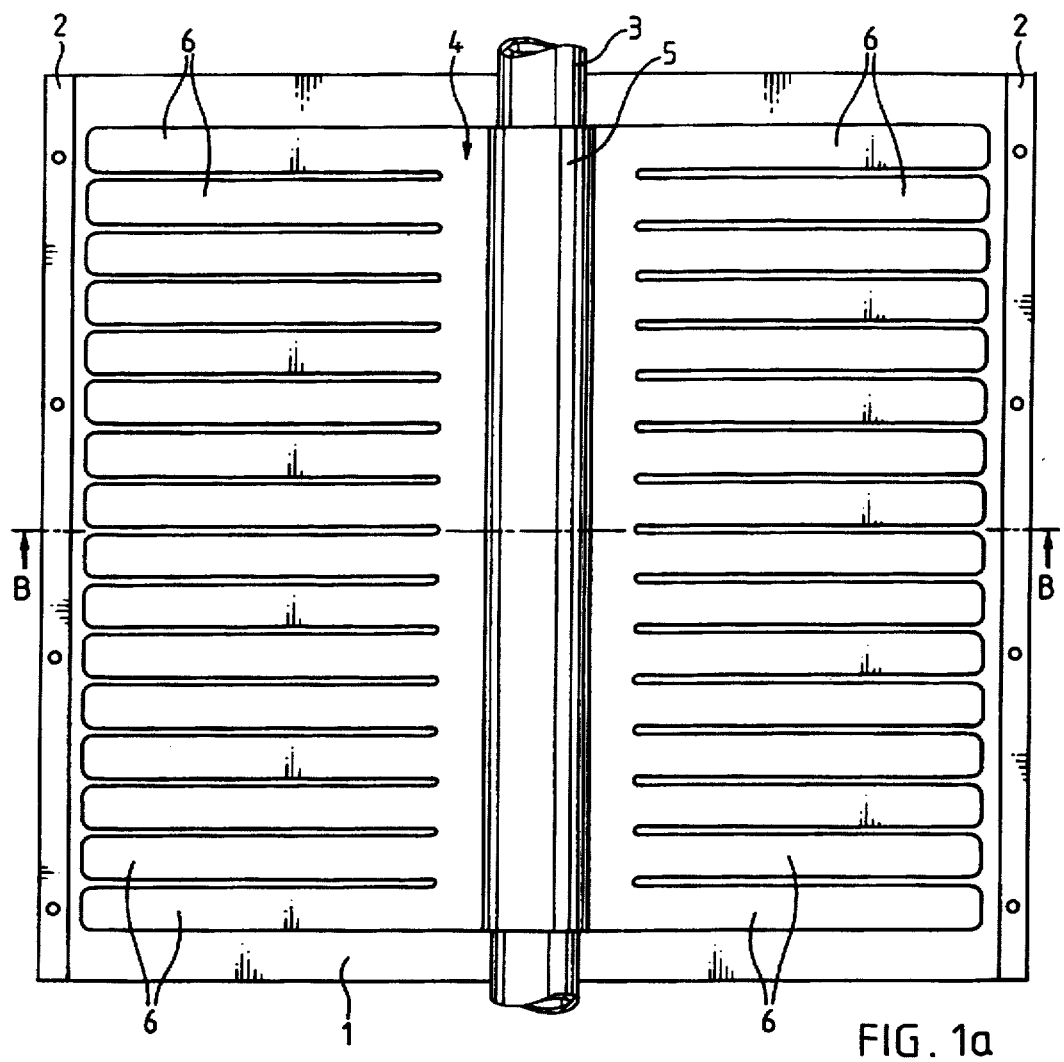
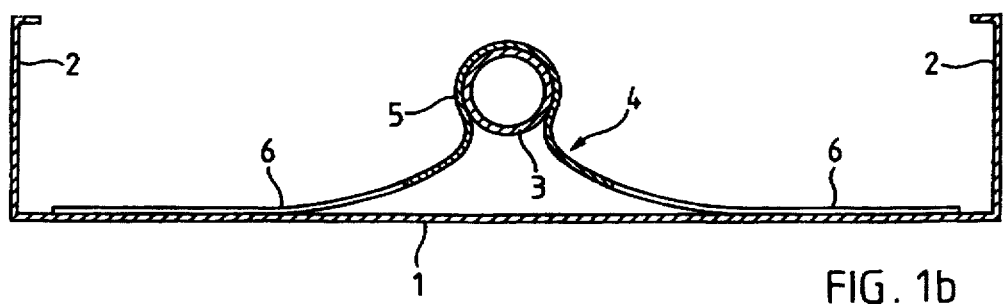
FIG. 1a
FIG. 1b

CONTACT ELEMENT AND CEILING ELEMENT FOR A HEATING AND COOLING CEILING

BACKGROUND OF THE INVENTION

1. Field of the Invention

The present invention relates to a contact element for providing heat transfer from a heat transfer medium to a ceiling and to a ceiling element which is intended for a ceiling of this type and contains such a contact element.

2. Description of the Related Art

Various configurations of ceiling elements which can be used for heating ceilings and cooling ceilings and for ceilings which are intended for both heating and cooling are known. A number of such configurations are described in H. Sokolean: "Kühldeckentechnologie zur Erreichung des bestmöglichen Raumkomforts" [Cooling-ceiling technology for achieving the best possible interior conditions], Architektur und Technik 8/92, p. 49–53, B+L Verlags AG, Schlieren (Switzerland).

One of the basic problems of ceiling elements of the type mentioned here is the task of constantly ensuring good heat transfer between a heat transfer medium, usually a liquid, which flows through the element and the ceiling panel, which closes off the ceiling element from the room which is to be conditioned climatically. It is the heat transfer to the ceiling panel which causes particular problems here. This is because the ceiling panel inevitably sags to a more or less pronounced degree due to its dead weight, with the result that the distance from the conduit through which the heat transfer medium flows, the conduit usually being designed as a rigid pipe, is not constant, even if other possible irregularities of the ceiling are disregarded. There are technically satisfactory solutions, such as those which emerge from the abovementioned article, for this problem. It is thus possible for a ceiling element, for example, to be extruded from aluminium in one piece with the ceiling panel and a guide which is arranged on the upper side of said element and into which a copper or steel pipe is passed as corrosion protection with respect to the liquid. However, this configuration involves a high degree of outlay and is correspondingly expensive.

Less expensive solutions are those in which the guide is part of a contact element which is produced separately from the ceiling panel, e.g. is extruded from aluminium or another corrosion-resistant material and is adhesively bonded directly to the ceiling panel. In this case too, however, the production outlay is not insignificant, especially since, on account of the thermal stressing which occurs, the adhesive connection has to satisfy high requirements. Alternatively, if a contact element is dispensed with, it is possible for thin plastic tubes through which heat transfer medium flows to be positioned directly on the ceiling panel. In this case, however, the heat transfer is unsatisfactory without additional measures which render production more expensive.

CH-A-241 602 discloses a contact element of the generic type which encloses, in a manner similar to a pipe clamp, a pipe through which heat transfer medium flows and is held together, and secured on the pipe, by a bolt. The contact element terminates in two contact continuations which project obliquely downwards and outwards and rest against a ceiling panel, elastic deformation taking place in the process. However, if the contact element follows the pipe over a relatively long stretch, as is necessary in order to achieve a high degree of heat transfer, it is only possible for the contact continuations, which are obviously continuous in the longitudinal direction, to fix snugly against any irregularities of the ceiling panel to a very limited extent at best, and this may severely impair the heat transfer.

FR-A-1 107 119 discloses a contact element which consists of elastic sheet metal, forms a channel which is open at the top and into which a pipe can be snap-fitted, and terminates in two contact continuations which rest against a ceiling panel. There is barely any possibility of adapting the contact continuations to any irregularities of the ceiling panel, so that, if the contact element follows the pipe over a relatively large stretch, good heat transfer is not ensured.

SUMMARY OF THE INVENTION

The object of the invention is to specify a contact element which produces very good heat transfer between the conduit through which a heat transfer medium flows and the ceiling panel, even if the ceiling panel has irregularitaies. It is also desirable that the contact element can be produced at favourable prices, and also to specify a corresponding ceiling element. These objects are achieved by the contact element as characterized in the claims and by the ceiling element which is based thereon. Examples are given for solutions in which the contact element is largely independent of the ceiling panel, but good heat-conducting contact is nevertheless produced between them in a simple manner.

The advantages achieved by the present invention being the contact element ensures excellent thermal contact even in the case of the ceiling panel having unfavourable geometry, in particular, in the case of small scale irregularities. In addition, the contact element can be produced comparatively inexpensively. Furthermore, for installation purposes, the contact element can be handled easily and is capable of flexible application since the connection between the heat transfer liquid-channelling conduit and the contact element may be configured to be easily made and releasable, and there is no fixed connection at all between the contact element and the ceiling panel. The contact elements may thus be arranged very easily and, if required, also adapted at a later date, with little effort, to any changes in the local heating or cooling capacity.

BRIEF DESCRIPTION OF THE DRAWINGS

The invention is explained in more detail hereinbelow with reference to figures, which merely illustrate exemplary embodiments and in which:

FIG. 1a shows a plan view of a first embodiment of a ceiling element according to the invention, FIG. 1b shows a cross-section along B—B through the ceiling element of FIG. 1a, FIG. 2 shows a cross-section through a second embodiment of a ceiling element according to the invention, FIG. 3b shows a longitudinal section along B—B in FIG. 3a.

BRIEF DESCRIPTION OF THE PREFERRED EMBODIMENT

Figure 2:
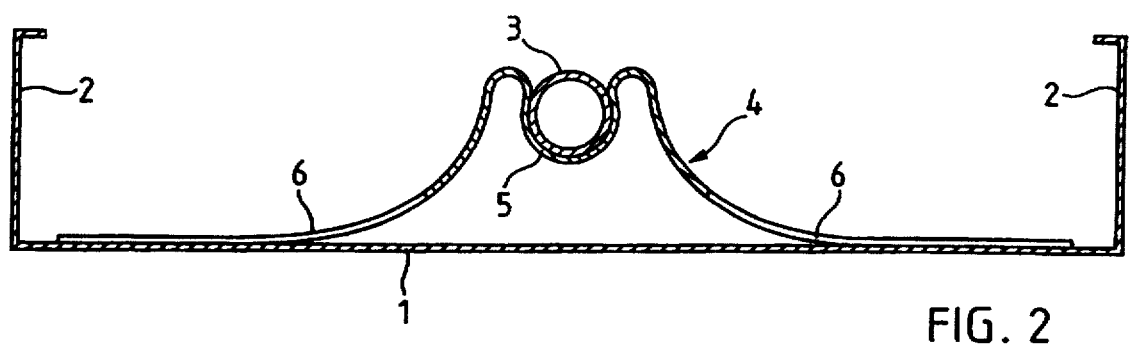

In accordance with the present invention, a rectangular, preferably perforated ceiling panel 1, formed, for example, from sheet aluminium, sheet steel, plastic or wood, closes off all the ceiling elements with respect to the room which is to be conditioned climatically. The shape of the ceiling panel and the material from which it is made may vary. The ceiling panel 1 has lateral flanges 2 for fastening purposes. The heat transfer medium, usually water, brine or another liquid, is channelled through a pipe 3, which may be formed from, for example, copper, steel or plastic. It is also possible to use a tube instead of a pipe. However, metal pipes are particularly suitable in the event of high demands being placed on the heat transfer.

In order to heat between the pipe 3 and the ceiling panel 1 with a high degree of efficiency, a contact element 4 which is produced in one piece from sheet metal is provided. The contact element material should conduct heat well and be plastically or elastically deformable, preferably elastically deformable. Suitable materials for this purpose are therefore, copper alloys, e.g. brass or a copper/beryllium alloy. Of course, rather than being straight, as illustrated in the figures, the pipe may also run in a meandering fashion over the ceiling panel 1 and the heat-conducting contact may be produced by a plurality of contact elements.

In a first embodiment of the invention (FIGS. 1a, 1b), a guide channel 5 which is open at the bottom is produced in the contact element 4 by bending, as a guide for the pipe 3, and the contact element 4 is snap-fitted onto the pipe 3 from above by means of said guide channel. The contact element 4 presses elastically against the pipe 3 in the region of the guide channel 5, with the result that good heat-conducting contact prevails between these parts.

According to the first embodiment, the contact element 4 has two rows, arranged symmetrically on borders 15 parallel to the guide channel 5, of parallel contact fingers 6 which are located one beside the other, and are designed as thin strips of approximately 1 cm in width the contact fingers 6 project downwards and outwards in the non-loaded state, but, when the ceiling element is assembled, are bent elastically into the horizontal by virtue of-the contact with the upper side of the ceiling panel 1, as is shown in FIG. 1b.

The subdivision of that part of the contact element 4 which is directed towards the ceiling panel 1 into a multiplicity of contact fingers 6—at least two per row, but usually at least 8 to 10, although the number may also amount to 16, as shown, or even be considerably greater—results not only in considerably increased elastic compliance, but, in particular, in the contact surface which makes contact with the ceiling panel 1 being divided up into comparatively small units which are largely isolated from one another and fit snugly against the upper side of the ceiling panel 1 independently of one another, with the result that any irregularities—even small irregularities—of the ceiling panel may readily be compensated. Together, the contact fingers 6 thus form a large contact surface area which rests very closely against the ceiling panel 1 and ensures excellent heat transfer. By virtue of its elasticity and of its small width, the individual contact finger 6 is pressed closely up against the upper side of the ceiling panel 1 over much of the length of the contact finger. Since the contact element 4 is not connected in a non-displaceable manner—e.g. adhesively bonded—either to the pipe 3 or the ceiling panel 1, different heat expansions of the different parts do not impair the thermal contact or lead to difficulties in any other way.

Depending on the use conditions of the contact element, the dimensions and the elastic properties of the contact fingers 6 may vary greatly. The more pronounced the likely irregularities of the ceiling panel 1, then the smaller the width of the contact fingers, and their elastic resistance, will be. In general, the width is preferably between 2 mm and 20 mm, but other values are also possible. In extreme cases, the contact fingers may also be designed as wires. Contact FIG. 6 are preferably arranged in a fringe-like manner on the border of a sheet-like contact element, but it is also possible to provide contact fingers which are designed in the manner of loops which do not have free ends. It is also conceivable to arrange the contact fingers 6 distributed over a surface, e. g. in several parallel rows, forming a brush-like structure.

The contact fingers 6 may be produced, for example, by punching or chemical milling. The latter type of production has the advantage that the formation of ridges, which may impair the heat transfer, is avoided.

In a second embodiment (FIG. 2), the contact element 4 is of a slightly different design in so far as the guide channel 5 is open at the top. The pipe 3 may thus be snap-fitted into the guide channel 5 from the top.

Figure 3A:
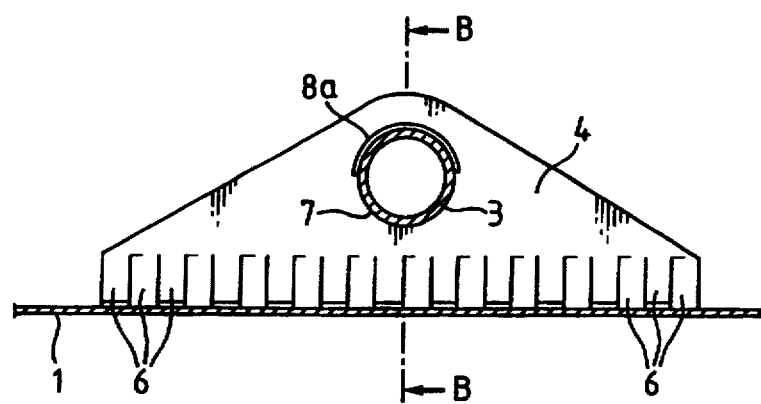
FIG. 3a shows a cross-section, along A—A in FIG. 3b, through a third embodiment of a ceiling element according to the invention.
Figure 3B:
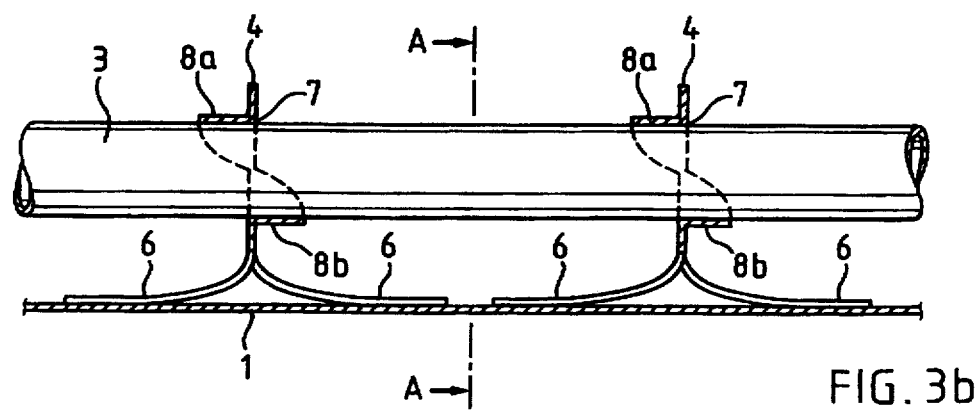

In a third embodiment (FIGS. 3a, b), the contact element 4 is designed in each case as an approximately triangular plate 20 which is aligned transversely with respect to the pipe 3 and bears, on its bottom border 17 a row of contact fingers 6 arranged one beside the other. The guide for the pipe 3 is formed by a circular opening 7 in the plate 20 and two extensions 8a, b which adjoin said opening and with which the pipe is in close contact ensuring good heat conduction. The contact elements 4 may be pushed onto the pipe 3 one after the other.

In the non-stressed state, the contact fingers 6 project obliquely downwards, bent alternately towards opposite sides, with the result that, in the event of contact with the upper side of the ceiling panel 1, they automatically fit snugly against the ceiling panel 1 in alternately opposite directions, as shown, and partially cover a comparatively large surface area. If the contact elements are pushed onto the pipe so as to be oriented alternately in opposite directions, then the contact fingers of successive contact elements engage one into the other, with the result that they can also be pushed comparatively closely together. With the contact fingers aligned in the same direction, it is only the extensions 8a, b which place limits on this.

I claim:

1. A contact element for providing heat transfer from a heat transfer medium to a ceiling, said contact element comprising:

a guide for holding, in heat-conducting contact, a conduit through which heat transfer medium flows; and a contact surface for making contact with a ceiling panel, at least part of said contact surface including a plurality of contact fingers for contacting the ceiling panel and moveable relative to each other, said contact fingers comprising a deformable material and being arranged alongside one another in heat-conducting connection with the guide.

2. The contact element of claim 1 wherein the contact fingers comprise an elastically deformable material.

3. The contact element of claim 1 wherein the contact fingers comprise a plastically deformable material.

4. The contact element of claim 1, wherein a row includes at least four substantially parallel contact fingers.

5. The contact element of claim 1, wherein the contact fingers are formed as strips.

6. The contact element of claim 5, wherein the width of each of the contact fingers is between 2 mm and 20 mm.

7. The contact element of claim 1, wherein the contact fingers contain copper.

8. The contact element of claim 7, wherein the contact fingers comprise an elastic copper alloy.

9. The contact element according to claim 1, wherein the contact element is a unitary piece of sheet metal.

10. The contact element of claim 9, wherein said contact fingers are arranged at least partly adjacent a border of a ceiling element.

11. The contact element of claim 10, wherein said guide has a guide channel formed by bending, and wherein at least one row of contact fingers are arranged adjacent borders of the ceiling element and approximately parallel to said guide channel.

12. The contact element of claim 10, wherein said guide has a through passage, and wherein borders of the ceiling element are transverse to the through passage, and at least one row of contact fingers is arranged parallel to the borders.

13. The contact element of claim 1, wherein the contact fingers are produced by punching.

14. The contact element of claim 1, wherein the contact fingers are produced by chemical milling.

15. The contact element of claim 1, wherein the contact element is capable of being snap-fitted onto a conduit.

16. A ceiling element for providing heat transfer to a ceiling, said ceiling element comprising:

a ceiling panel having an upper side;

a contact element for providing heat transfer from a heat transfer medium arranged on the upper side of the ceiling panel, said contact element including a guide for holding, in heat-conducting contact, a conduit through which the heat transfer medium flows; and a contact surface having a plurality of contact fingers in heat-conducting connection with the guide, wherein said contact fingers are arranged alongside one another, are moveable relative to each other, and fit snugly against the upper side of the ceiling panel when said guide is in heat-conducting contact with said conduit.

17. The contact element of claim 1, wherein the contact fingers are located beside each other to form at least one row.

18. The ceiling element of claim 16, wherein the contact fingers are located beside each other to form at least one row.

19. The ceiling element of claim 16, wherein the contact fingers are displaceable relative to the ceiling panel.

* * * * *